United States Patent
Yamada et al.

(10) Patent No.: US 11,332,561 B2
(45) Date of Patent: May 17, 2022

(54) FLUORINATED ELASTIC COPOLYMER COMPOSITION, COATING MATERIAL, AND COATED ARTICLE

(71) Applicant: AGC Inc., Chiyoda-ku (JP)

(72) Inventors: Takeshi Yamada, Chiyoda-ku (JP); Toshifumi Kakiuchi, Chiyoda-ku (JP); Aya Serita, Chiyoda-ku (JP); Masahide Yodogawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/830,643

(22) Filed: Mar. 26, 2020

(65) Prior Publication Data

US 2020/0223965 A1  Jul. 16, 2020

Related U.S. Application Data

(63) Continuation of application No. PCT/JP2018/037457, filed on Oct. 5, 2018.

(30) Foreign Application Priority Data

Oct. 12, 2017  (JP) .............................. JP2017-198408

(51) Int. Cl.

| | | |
|---|---|---|
| C08F 214/26 | (2006.01) | |
| C09D 7/61 | (2018.01) | |
| C09D 7/20 | (2018.01) | |
| C08K 3/04 | (2006.01) | |
| C08K 3/36 | (2006.01) | |
| C08L 27/18 | (2006.01) | |
| C09D 127/18 | (2006.01) | |
| C09J 127/18 | (2006.01) | |

(52) U.S. Cl.
CPC ............ C08F 214/265 (2013.01); C08K 3/04 (2013.01); C08K 3/36 (2013.01); C08L 27/18 (2013.01); C09D 7/20 (2018.01); C09D 7/61 (2018.01); C09D 127/18 (2013.01); C09J 127/18 (2013.01); C08F 2800/10 (2013.01)

(58) Field of Classification Search
CPC .. C08F 214/265; C08F 2800/10; C08L 27/18; C08K 3/04; C08K 3/36; C09D 127/18; C09D 7/20; C09D 7/61; C09J 127/18
USPC ........................................................ 524/546
See application file for complete search history.

(56) References Cited

U.S. PATENT DOCUMENTS

| | | | | |
|---|---|---|---|---|
| 3,740,369 A | * | 6/1973 | Proskow | C08L 2666/28 524/107 |
| 6,248,823 B1 | * | 6/2001 | Hrivnak | C08J 3/093 524/462 |
| 2009/0018275 A1 | * | 1/2009 | Campbell | C08J 5/12 525/416 |
| 2015/0141604 A1 | * | 5/2015 | Sugiyama | C08F 216/1408 526/206 |
| 2016/0185995 A1 | * | 6/2016 | Mugisawa | C09D 127/18 428/422 |
| 2016/0194528 A1 | | 7/2016 | Funaki et al. | |
| 2017/0283585 A1 | * | 10/2017 | Sumino | C08K 5/3437 |

FOREIGN PATENT DOCUMENTS

| | | |
|---|---|---|
| EP | 1 589 377 A2 | 10/2005 |
| JP | 2002-519493 A | 7/2002 |
| JP | 2014070101 A * | 4/2014 |
| JP | 2014-240496 A | 12/2014 |
| JP | 2015-182381 A | 10/2015 |
| JP | 5816474 B2 | 11/2015 |
| JP | 6057494 B2 | 1/2017 |
| WO | WO 2005/49746 A1 | 6/2005 |
| WO | WO 2008/094758 A1 | 8/2008 |
| WO | WO 2008/094758 A8 | 8/2008 |
| WO | WO 2014/030586 A1 | 2/2014 |
| WO | WO 2015/068659 A1 | 5/2015 |
| WO | WO 2018/0431 65 A1 | 3/2018 |
| WO | WO 2018/159307 A1 | 9/2018 |
| WO | WO 2018/159308 A1 | 9/2018 |
| WO | WO 2018/163746 A1 | 9/2018 |

OTHER PUBLICATIONS

Translation of JP 2014-070101 (patent application 2012-215136), Apr. 21, 2014. (Year: 2014).*
FC-35, Wikipedia, Feb. 8, 2021. (Year: 2021).*
STIC search, Dec. 1, 2020. (Year: 2020).*
International Search Report dated Jan. 15, 2019 in PCT/JP2018/037457 filed Oct. 5, 2018, citing documents AA-AD and AO-AV therein, 2 pages.

* cited by examiner

*Primary Examiner* — Hui H Chin
(74) *Attorney, Agent, or Firm* — Oblon, McClelland, Maier & Neustadt, L.L.P.

(57) ABSTRACT

To provide a fluorinated elastic copolymer composition such that solubility of a fluorinated elastic copolymer in a solvent is excellent, the solvent is easily removed, and the solvent is easily available.

A fluorinated elastic copolymer composition comprising a fluorinated elastic copolymer having units based tetrafluoroethylene and units based on $CF_2=CFOR^{f1}$ (wherein $R^{f1}$ is a $C_{1-10}$ perfluoroalkyl group), and a fluorinated solvent having a perfluorohydrocarbon group, wherein the perfluorohydrocarbon group having the largest number of carbon atoms in the fluorinated solvent has from 3 to 7 carbon atoms, the fluorinated solvent has a boiling point of from 50 to 160° C., and the fluorinated solvent has a fluorine atom content (fluorine atom content (mass %)=(19× number of fluorine atoms in the fluorinated solvent/molecular weight of the fluorinated solvent)×100) of from 69 to 80 mass %.

9 Claims, No Drawings

FLUORINATED ELASTIC COPOLYMER COMPOSITION, COATING MATERIAL, AND COATED ARTICLE

TECHNICAL FIELD

The present invention relates to a fluorinated elastic copolymer composition, a coating material, and a coated article.

BACKGROUND ART

A fluorinated elastic copolymer such as a tetrafluoroethylene/perfluoro(alkyl vinyl ether) copolymer is excellent in chemical resistance, solvent resistance, heat resistance, etc. In order to apply a fluorinated elastic copolymer to a surface of a substrate, a technique to dissolve a fluorinated elastic copolymer excellent in solvent resistance in a solvent to be formed into a solution has been known (Patent Documents 1 to 3).

Further, in order that a fluorinated elastic copolymer further has functions, it has been known to incorporate various additives to form a copolymer composition (Patent Document 4). As a method of dispersing components incorporated into a fluorinated copolymer composition, it is common to employ kneading by imparting a strong force such as shearing force.

Patent Documents 1 and 2 disclose a solution comprising a curable perfluoropolymer, a curing agent and a fluorinated solvent. Patent Document 3 discloses a fluorinated elastomer coating material composition containing a fluorinated elastomer and a fluorinated solvent. Patent Document 4 discloses a carbon fiber composite material having carbon nanofibers dispersed in a perfluoroelastomer.

PRIOR ART DOCUMENTS

Patent Documents

Patent Document 1: Japanese Patent No. 6057494
Patent Document 2: JP-A-2014-240496
Patent Document 3: WO2005/049746
Patent Document 4: Japanese Patent No. 5816474

DISCLOSURE OF INVENTION

Technical Problem

However, Fluorinert (registered trademark) FC-43 exemplified as the fluorinated solvent in Patent Documents 1 and 2 has a boiling point of so high as about 174° C. Accordingly, from the solution in Patent Documents 1 and 2, the fluorinated solvent is hardly removed by evaporation. Thus, if the solution in Patent Documents 1 and 2 is applied to the surface of a substrate, drying will take long, thus lowering the workability.

Further, Fluorinert (registered trademark) FC-77 exemplified as the fluorinated solvent in Patent Document 3 contains a compound having a C8 perfluorohydrocarbon group. Such a fluorinated solvent with a large number of carbon atoms is hardly available in recent years.

Further, in a case where e.g. strong shearing force is applied to the carbon nanofibers in the process for producing the carbon fiber composite material as in Patent Document 4, the carbon nanofibers may be broken.

It is an object of the present invention to provide a fluorinated elastic copolymer composition such that solubility of a fluorinated elastic copolymer in a solvent is excellent, the solvent is easily removed, the solvent is easily available, additives and the like are dispersed without applying an excessive shearing force or without applying a shearing force or the like for a long period of time.

Solution to Problem

The present invention provides the following constitutions.

[1] A fluorinated elastic copolymer composition comprising a fluorinated elastic copolymer having units based on tetrafluoroethylene and units based on a compound represented by the following formula 1, and a fluorinated solvent,
wherein the fluorinated solvent has at least one perfluorohydrocarbon group, and the perfluorohydrocarbon group having the largest number of carbon atoms has from 3 to 7 carbon atoms,
the fluorinated solvent has a boiling point of from 50 to 160° C., and
the fluorinated solvent has a fluorine atom content as calculated in accordance with the following formula 2 of from 69 to 80 mass %:

$$CF_2=CFOR^{f1} \qquad 1$$

wherein $R^{f1}$ is a $C_{1-10}$ perfluoroalkyl group;

fluorine atom content (mass %)=(19×number of fluorine atoms in the fluorinated solvent/molecular weight of the fluorinated solvent)×100    2

[2] The fluorinated elastic copolymer composition according to [1], which contains, as the fluorinated solvent, at least one member selected from the group consisting of a fluorinated solvent having a nitrogen atom, a hydrofluorocarbon, and a hydrofluoroether.

[3] The fluorinated elastic copolymer composition according to [1] or [2], which further contains a crosslinking agent, or a crosslinking agent and a crosslinking aid.

[4] The fluorinated elastic copolymer composition according to [3], wherein the content of the crosslinking agent is from 0.3 to 10 parts by mass per 100 parts by mass of the fluorinated elastic copolymer, and in a case where the crosslinking aid is contained, the content of the crosslinking aid is from 0.1 to 10 parts by mass per 100 parts by mass of the fluorinated elastic copolymer.

[5] The fluorinated elastic copolymer composition according to any one of [1] to [4], which further contains at least one of a filler and a reinforcing material.

[6] The fluorinated elastic copolymer composition according to [5], wherein the total content of the filler and the reinforcing material is from 0.01 to 100 parts by mass per 100 parts by mass of the fluorinated copolymer.

[7] A coating material comprising the fluorinated elastic copolymer composition as defined in any one of [1] to [6].

[8] An adhesive comprising the fluorinated elastic copolymer composition as defined in any one of [1] to [6].

[9] A coated article having a coating film containing no fluorinated solvent, formed of the coating material as defined in [7].

[10] The coated article according to [9], wherein the coating material is a coating material containing a crosslinking agent or a crosslinking agent and a crosslinking aid, and the coating film is a coating film formed of a crosslinked fluorinated elastic copolymer.

[11] A method for producing a composition containing no fluorinated solvent, which comprises mixing a crosslinking agent or a crosslinking agent and a crosslinking aid, a fluorinated elastic copolymer having units based on tetrafluoroethylene and units based on a compound represented by the following formula 1, and the following fluorinated solvent, to produce a fluorinated elastic copolymer composition, and removing the fluorinated solvent, wherein the fluorinated solvent has at least one perfluorohydrocarbon group, and the perfluorohydrocarbon group having the largest number of carbon atoms has from 3 to 7 carbon atoms, the fluorinated solvent has a boiling point of from 50 to 160° C., and the fluorinated solvent has a fluorine atom content as calculated in accordance with the following formula 2 of from 69 to 80 mass %:

$$CF_2=CFOR^{f1} \qquad 1$$

wherein $R^{f1}$ is a $C_{1-10}$ perfluoroalkyl group;

fluorine atom content (mass %)=(19×number of fluorine atoms in the fluorinated solvent/molecular weight of the fluorinated solvent)×100    2

[12] The method for producing a composition containing no fluorinated solvent according to [11], wherein the fluorinated elastic copolymer composition further contains at least one of a filler and a reinforcing material.

Advantageous Effects of Invention

According to the present invention, it is possible to obtain a fluorinated elastic copolymer composition such that the solubility of a fluorinated elastic copolymer in a solvent is excellent, the solvent is easily removed, the solvent is easily available, and additives and the like are dispersed without applying an excessive shearing force.

According to the present invention, it is possible to obtain a coating material or an adhesive such that solubility of a fluorinated elastic copolymer in a solvent is excellent, the solvent is easily removed, and the solvent is easily available.

According to the present invention, it is possible to obtain a coated article without lowering workability.

According to the present invention, it is possible to obtain a composition such that dispersibility of constituents is excellent. Further, in a case where a composition containing no fluorinated solvent obtained by removing a fluorinated solvent from the fluorinated elastic copolymer composition contains a crosslinking agent, by crosslinking the composition, a crosslinked product such that dispersibility of constituents is excellent can be obtained.

DESCRIPTION OF EMBODIMENTS

Meanings of the following terms in this specification are as follows.

"Units" means an atomic group directly formed by polymerizing one monomer molecule, or an atomic group obtained by chemical conversion of a part of the atomic group.

A "perfluorohydrocarbon group" means a group having all hydrogen atoms in a hydrocarbon group substituted by a fluorine atom. A perfluorohydrocarbon group in a perfluoroalkane is an atomic group having one fluorine atom removed from the perfluoroalkane.

The "boiling point" is a value measured under atmospheric pressure.

An "etheric oxygen atom" means an oxygen atom forming an ether bond (—O—) between carbon atoms.

<Fluorinated Elastic Copolymer Composition>

The fluorinated elastic copolymer composition of the present invention comprises a specific fluorinated elastic copolymer and a certain fluorinated solvent (hereinafter sometimes referred to as a specific fluorinated solvent). The fluorinated elastic copolymer composition of the present invention may contain, within a range not to impair the effects of the present invention, a crosslinking agent, a crosslinking aid and other additives. Further, the fluorinated elastic copolymer composition of the present invention may contain two or more types of the specific fluorinated elastic copolymer, and may contain two or more types of the specific fluorinated solvent.

(Fluorinated Elastic Copolymer)

The fluorinated elastic copolymer of the present invention has units based on tetrafluoroethylene (hereinafter referred to as TFE) (hereinafter referred to as TFE units) and units based on the after-described compound 1 (hereinafter referred to as PAVE units). The fluorinated elastic copolymer may have at least one of units based on the after-described compound 3 (hereinafter referred to as units c) and units based on a fluorinated monomer having at least two polymerizable unsaturated bonds (hereinafter referred to as units d). The fluorinated elastic copolymer may further have units based on another monomer (hereinafter sometimes referred to as units e) as the case requires within a range not to impair the effects of the present invention.

The PAVE units are units based on compound 1 represented by the following formula 1:

$$CF_2=CFOR^{f1} \qquad 1$$

wherein $R^{f1}$ is a $C_{1-10}$ perfluoroalkyl group.

The perfluoroalkyl group as $R^{11}$ may be linear or branched. The number of carbon atoms in $R^{f1}$ is preferably from 1 to 5, more preferably from 1 to 3, whereby the productivity of the fluorinated elastic copolymer will improve.

As specific examples of the compound 1, the following compounds may be mentioned.

$$CF_2=CFOCF_3 \text{(PMVE)}$$

$$CF_2=CFOCF_2CF_3 \text{ (PEVE)}$$

$$CF_2=CFOCF_2CF_2CF_3 \text{ (PPVE)}$$

$$CF_2=CFOCF_2CF_2CF_2CF_3$$

The compound 1 is preferably PMVE, PEVE or PPVE, whereby the productivity of the fluorinated elastic copolymer will improve.

The units c are units based on compound 3 represented by the following formula 3. By the fluorinated elastic copolymer having the units c, rubber properties at low temperature when the fluorinated elastic copolymer is formed into a crosslinked rubber article (hereinafter sometimes referred to as low temperature properties) will be more excellent.

$$CF_2=CF(OR^{f2})_n-(OCF_2)_m-OR^{f5} \qquad 3$$

wherein $R^{f2}$ is a $C_{2-4}$ perfluoroalkyl group, $R^{f5}$ is a $C_{1-4}$ perfluoroalkyl group, n is an integer of from 0 to 3, m is an integer of from 0 to 4, and n+m is an integer of from 1 to 7.

In the formula 3, n and m respectively represent the numbers of $(OR^{f2})$ and $(OCF_2)$. Accordingly, the formula 3 does not represent the order of dispositions of $(OR^{f2})_n$ and $(OCF_2)_m$, and in a case where n and m are each at least 2, $(OR^{f2})_n$ and $(OCF_2)_m$ do not represent the block disposition of $(OR^{f2})$ and $(OCF_2)$.

The perfluoroalkylene group as $R^{f2}$ and the perfluoroalkyl group as $R^{f5}$ are preferably linear. The number of carbon atoms in $R^{f2}$ is preferably 2 or 3. The number of carbon atoms in $R^{f5}$ is preferably from 1 to 3. When n is at least 2, a plurality of $R^{f2}$ may be the same or different.

When n is 0, m is preferably 3 or 4.
When n is 1, m is preferably from 2 to 4.
When n is 2 or 3, m is preferably 0.
n is preferably 1 to 3.

When the numbers of carbon atoms in $R^{f2}$ and $R^{f5}$, and n and m are within the above ranges, the low temperature properties when the fluorinated elastic copolymer is formed into a crosslinked rubber article will be more excellent, and the productivity of the fluorinated elastic copolymer will improve.

As specific examples of the compound 3, the following compounds may be mentioned.

$CF_2=CF-OCF_2CF_2-(OCF_2)_4-OCF_3$ (C9PEVE)

$CF_2=CF-OCF_2CF_2-(OCF_2)_2-OCF_3$ (C7PEVE)

$CF_2=CF-(OCF_2CF_2)_2-OCF_2CF_3$ (EEAVE)

$CF_2=CF-(OCF_2CF_2)_3-OCF_2CF_3$ (EEEAVE)

$CF_2=CF-OCF_2-OCF_3$ $CF_2=CF-OCF_2-OCF_2CF_3$ $CF_2=CF-(OCF_2CF(CF_3))_2-OCF_2CF_2CF_3$, $CF_2=CF-(OCF_2)_2-OCF_3$

The compound 3 is preferably C9PEVE, C7PEVE, EEAVE or EEEAVE, whereby the low temperature properties when the fluorinated elastic copolymer is formed into a crosslinked rubber article will be more excellent, and the productivity of the fluorinated elastic copolymer will improve.

Such compounds may be produced by the method disclosed in WO00/56694 from corresponding alcohols as raw materials.

The units d are units based on a fluorinated monomer having at least two polymerizable unsaturated bonds. By the fluorinated elastic copolymer having the units d, the low temperature properties will be more excellent while rubber properties when the fluorinated elastic copolymer is formed into a crosslinked rubber article are maintained.

The polymerizable unsaturated bond may, for example, be a double bond (C=C) or a triple bond (C≡C) between carbon atoms, and is preferably a double bond. The number of the polymerizable unsaturated bonds is preferably from 2 to 6, more preferably 2 or 3, particularly preferably 2.

The fluorinated monomer having at least two polymerizable unsaturated bonds is preferably a perfluoro compound.

As the fluorinated monomer having at least two polymerizable unsaturated bonds, compound 4 represented by the following formula 4 is preferred in that while rubber properties when the fluorinated elastic copolymer is formed into a crosslinked rubber article are maintained, the low temperature properties will be more excellent.

$$CF_2=CFOR^{f3}OCF=CF_2 \quad\quad 4$$

wherein $R^{f3}$ is a $C_{1-25}$ perfluoroalkylene group or a group having at least one etheric oxygen atom between carbon atoms of a $C_{2-25}$ perfluoroalkylene group.

The perfluoroalkylene group as $R^{f3}$ may be linear or branched. The number of carbon atoms in $R^{f3}$ is preferably 3 or 4, in that while rubber properties when the fluorinated elastic copolymer is formed into a crosslinked rubber article are maintained, the low temperature properties will be more excellent.

As specific examples of the compound 4, the following compounds may be mentioned.

$CF_2=CFO(CF_2)_2OCF=CF_2$ $CF_2=CFO(CF_2)_3OCF=CF_2$ (C3DVE)

$CF_2=CFO(CF_2)_4OCF=CF_2$ (C4DVE)

$CF_2=CFO(CF_2)_6OCF=CF_2$ $CF_2=CFO(CF_2)_8OCF=CF_2$ $CF_2=CFO(CF_2)_2OCF(CF_3)CF_2OCF=CF_2$ $CF_2=CFO(CF_2)_2O(CF(CF_3)CF_2)_2CF=CF_2$ $CF_2=CFOCF_2O(CF_2CF_2O)_2CF=CF_2$ $CF_2=CFO(CF_2O)_3(CF(CF_3)CF_2O)_2CF=CF_2$ $CF_2=CFOCF_2CF(CF_3)O(CF_2)_2OCF(CF_3)$
$\quad CF_2OCF=CF_2$ $CF_2=CFOCF_2CF_2O(CF_2O)_2CF_2CF_2OCF=CF_2$ As the compound 4, C3DVE or C4DVE is particularly preferred in that while rubber properties when the fluorinated elastic copolymer is formed into a crosslinked rubber article are maintained, the low temperature properties will be more excellent.

The units e are units based on another monomer.

As another monomer, a monomer having a fluorine atom and a nitrile group, or a monomer having a fluorine atom and a halogen atom other than a fluorine atom may, for example, be mentioned.

As the monomer having a fluorine atom and a nitrile group, compound 5 represented by the following formula 5 or compound 6 represented by the following formula 6 may, for example, be mentioned.

$$CF_2=CFO(CF_2CF(CF_3)O)_p(CF_2)_qCN \quad\quad 5$$

wherein p is an integer of from 0 to 5, and q is an integer of from 1 to 5.

$$CF_2=CFO(CF_2)_rOCF(CF_3)CN \quad\quad 6$$

wherein r is an integer of from 2 to 4.

As specific examples of the compound 5, the following compounds may be mentioned.

$CF_2=CFO(CF_2)_5CN$ $CF_2=CFOCF_2CF(CF_3)O(CF_2)_2CN$

As specific examples of the compound 6, the following compounds may be mentioned.

$CF_2=CFO(CF_2)_3OCF(CF_3)CN$

As the monomer having a fluorine atom and a halogen atom other than a fluorine atom, bromotrifluoroethylene or iodotrifluoroethylene may, for example, be mentioned.

In the fluorinated copolymer of the present invention, the proportion of the TFE units is preferably from 35 to 75 mol %, more preferably from 40 to 75 mol %, further preferably from 50 to 75 mol %, to the total amount of all units constituting the fluorinated elastic copolymer.

The proportion of the PAVE units is preferably from 25 to 75 mol %, more preferably from 25 to 60 mol %, further preferably from 25 to 50 mol %, to the total amount of all units constituting the fluorinated elastic copolymer.

In a case where the fluorinated copolymer has the units c, the proportion of the units c is preferably at most 57 mol %, more preferably from 3 to 40 mol %, further preferably from 5 to 30 mol %, to the total amount of all units constituting the fluorinated elastic copolymer.

In a case where the fluorinated copolymer has the units d, the proportion of the units d is preferably at most 1 mol %, more preferably from 0.01 to 0.5 mol %, further preferably from 0.05 to 0.3 mol %, to the total amount of all units constituting the fluorinated elastic copolymer.

In a case where the fluorinated copolymer has the units e, the proportion of the units e is preferably at most 5 mol %, more preferably at most 3 mol %, further preferably at most 2 mol %, to the total amount of all units constituting the fluorinated elastic copolymer.

When the proportions of the TFE units, the PAVE units, the units c, the units d and the units e are within the above ranges, while rubber properties when the fluorinated elastic copolymer is formed into a crosslinked rubber article are maintained, the low temperature properties will be more excellent.

The fluorinated elastic copolymer in the present invention more preferably further has iodine atoms, whereby the fluorinated elastic copolymer will be excellent in crosslinkability. The iodine atoms are preferably bonded to the terminal of the polymer chain of the fluorinated elastic copolymer. The terminal of the polymer chain includes both the terminal of the main chain and the terminal of the branched chain.

In a case where the fluorinated copolymer has iodine atoms, the content of iodine atoms is preferably from 0.01 to 1.5 mass %, more preferably from 0.01 to 1.0 mass %, to the total weight of the fluorinated elastic copolymer. When the content of iodine atoms is within the above range, crosslinkability of the fluorinated elastic copolymer will be more excellent.

(Method for Producing Fluorinated Elastic Copolymer)

The fluorinated elastic copolymer of the present invention may be produced by polymerizing a monomer component comprising TFE and PAVE. The monomer component may contain, as the case requires, monomers forming the units c, the units d and the units e.

As the polymerization method, radical polymerization method is preferred.

As a radical polymerization initiation source, a radical polymerization initiator, heating or irradiation with ionizing radiation may, for example, be mentioned. Among them, in view of excellent productivity of the fluorinated elastic copolymer, a radical polymerization initiator is preferred.

The radical polymerization initiator is not particularly limited.

As the radical polymerization initiator to be used for emulsion polymerization described hereinafter, a water-soluble initiator is preferred. The water-soluble initiator may, for example, be a persulfate (such as ammonium persulfate, sodium persulfate or potassium persulfate), hydrogen peroxide, a peroxide (such as disuccinic acid peroxide, diglutaric acid peroxide or tert-butyl hydroxyperoxide), an azo compound (such as azobisisobutylamidine dihydrochloride), a redox initiator comprising a combination of persulfuric acid or hydrogen peroxide and a reducing agent such as sodium hydrogen sulfite or sodium thiosulfate, or an inorganic initiator comprising the above redox initiator and further a small amount of iron, ferrous salt, silver sulfate or the like.

The amount of the radical polymerization initiator is preferably from 0.0001 to 5 parts by mass, more preferably from 0.001 to 2 parts by mass per 100 parts by mass of the monomer component.

In a case where the radical polymerization initiator is used, it is preferred that the monomer component is polymerized in the presence of a chain transfer agent.

The chain transfer agent may, for example, be an alcohol (such as methanol or ethanol), a chlorofluorohydrocarbon (such as 1,3-dichloro-1,1,2,2,3-pentafluoropropane or 1,1-dichloro-1-fluoroethane), a hydrocarbon (such as pentane, hexane or cyclohexane), compound 7 represented by the following formula 7, compound 8 represented by the following formula 8 or mercaptan (such as tert-dodecylmercaptan or n-octadecylmercaptan).

$$R^{fA}I_2 \qquad 7$$

$$R^{fA}IBr \qquad 8$$

wherein $R^{fA}$ is a $C_{1-16}$ polyfluoroalkylene group.

As $R^{fA}$, the polyfluoroalkylene group may be linear or branched. $R^{fA}$ is preferably a perfluoroalkylene group.

The compound 7 may, for example, be 1,4-diiodoperfluorobutane, 1,6-diiodoperfluorohexane or 1,8-diiodoperfluorooctane.

The compound 8 may, for example, be 1-iodo-4-bromoperfluorobutane, 1-iodo-6-bromoperfluorohexane or 1-iodo-8-bromoperfluorooctane.

The amount of the chain transfer agent is properly set based on the chain transfer constant of the chain transfer agent. For example, in a case where the compound 7 is used as the chain transfer agent, the amount of the chain transfer agent is preferably from 0.01 to 5 parts by mass, more preferably from 0.05 to 2 parts by mass per 100 parts by mass of the monomer component.

As the polymerization method, emulsion polymerization method, solution polymerization method, suspension polymerization method or bulk polymerization method may, for example, be mentioned. Among them, in view of adjustment of the molecular weight and the copolymer composition and excellent productivity, emulsion polymerization method is preferred.

In the emulsion polymerization method, the monomer component is polymerized in an aqueous medium containing an emulsifier.

The aqueous medium may, for example, be water or a mixture of water and a water-soluble organic solvent.

The water-soluble organic solvent may, for example, be tert-butanol, propylene glycol, dipropylene glycol, dipropylene glycol monomethyl ether or tripropylene glycol, and in that the polymerization rate of monomers will not lower, it is preferably tert-butanol or dipropylene glycol monomethyl ether.

When the aqueous medium contains a water-soluble organic solvent, dispersibility of the monomers and dispersibility of the fluorinated elastic copolymer will be excellent, and the productivity of the fluorinated elastic copolymer will be excellent.

The content of the water-soluble organic solvent is preferably from 1 to 40 parts by mass, more preferably from 3 to 30 parts by mass per 100 parts by mass of water.

The emulsifier may, for example, be an anionic emulsifier, a nonionic emulsifier or a cationic emulsifier. Among them, in view of more excellent mechanical and chemical stability of the latex, an anionic emulsifier is preferred.

The anionic emulsifier may, for example, be an emulsifier having a hydrocarbon group (such as sodium lauryl sulfate or sodium dodecylbenzene sulfonate), or an emulsifier having a fluorine atom (such as ammonium perfluorooctanoate, sodium perfluorooctanoate, ammonium perfluorohexanoate or compound 9 represented by the following formula 9).

$$F(CF_2)_tO(CF(X)CF_2O)_uCF(Y)COOA \qquad 9$$

wherein X and Y are a fluorine atom or a $C_{1-3}$ linear or branched perfluoroalkyl group, A is a hydrogen atom, an alkali metal or $NH_4$, t is an integer of from 2 to 10, and u is an integer of from 0 to 3.

As the compound 9, the following compounds may, for example, be mentioned.

$C_2F_5OCF_2CF_2OCF_2COONH_4$ $F(CF_2)_3O(CF(CF_3)CF_2O)_2CF(CF_3)COONH_4$ $F(CF_2)_3OCF_2CF_2OCF_2COONH_4$ $F(CF_2)_3O(CF_2CF_2O)_2CF_2COONH_4$ $F(CF_2)_4OCF_2CF_2OCF_2COONH_4$, $F(CF_2)_4O(CF_2CF_2O)_2CF_2COONH_4$ $F(CF_2)_3OCF_2CF_2OCF_2COONa$, $F(CF_2)_3O(CF_2CF_2O)_2CF_2COONa$ $F(CF_2)_4OCF_2CF_2OCF_2COONa$ $F(CF_2)_4O(CF_2CF_2O)_2CF_2COONa$ $F(CF_2)_2OCF_2CF_2OCF_2COONH_4$ $F(CF_2)_2O(CF_2CF_2O)_2CF_2COONH_4$ $F(CF_2)_2OCF_2CF_2OCF_2COONa$, $F(CF_2)_2O(CF_2CF_2O)_2CF_2COONa$

The anionic emulsifier is preferably ammonium perfluorooctanoate, $C_2F_5OCF_2CF_2OCF_2COONH_4$, $F(CF_2)_4OCF_2CF_2OCF_2COONH_4$ or $F(CF_2)_3OCF_2CF_2OCF_2COONH_4$.

The amount of the emulsifier is preferably from 0.01 to 15 parts by mass, more preferably from 0.1 to 10 parts by mass per 100 parts by mass of the aqueous medium.

By the emulsion polymerization method, a latex containing a fluorinated elastic copolymer is obtained. The fluorinated elastic copolymer is separated from the latex by aggregation.

The aggregation method may, for example, be addition of a metal salt, addition of an inorganic acid (such as hydrochloric acid), mechanical shearing or freezing and defrosting.

The polymerization conditions are properly selected depending upon the monomer composition and the decomposition temperature of the radical polymerization initiator.

The polymerization pressure is preferably from 0.1 to 20 MPa [gauge], more preferably from 0.3 to 10 MPa [gauge], further preferably from 0.3 to 5 MPa [gauge].

The polymerization temperature is preferably from 0 to 100° C., more preferably from 10 to 90° C., further preferably from 20 to 80° C.

The polymerization time is preferably from 1 to 72 hours, more preferably from 1 to 24 hours, further preferably from 1 to 12 hours.

By the emulsion polymerization method, a latex containing a fluorinated elastic copolymer is obtained. The fluorinated elastic copolymer is separated from the latex by aggregation.

The aggregation method may, for example, be addition of a metal salt, addition of an inorganic acid (such as hydrochloric acid), mechanical shearing or freezing and defrosting.

The acid may, for example, be nitric acid, sulfuric acid, oxalic acid or hydrofluoric acid. Among them, nitric acid or sulfuric acid is preferred in view of less corrosiveness on metals.

The aggregation treatment by the acid may be conducted by mixing the latex containing the fluorinated elastic copolymer and an aqueous solution containing the acid.

The aggregated fluorinated elastic copolymer is recovered e.g. by filtration and washed with a liquid medium.

The liquid medium used for washing is not particularly limited. The liquid medium may, for example, be water or ultrapure water.

The washed fluorinated elastic copolymer may be dried under reduced pressure (vacuum dried) with a view to suppressing deterioration of the fluorinated elastic copolymer by heat.

The drying temperature is not particularly limited and is preferably less than 100° C. The drying temperature is the temperature of the atmosphere in the dryer.

The pressure at the time of drying is not particularly limited and is preferably at most 50 kPa. When the pressure at the time of drying is at most 50 kPa, the fluorinated elastic copolymer can be sufficiently dried even when the drying temperature is low.

(Specific Fluorinated Solvent)

The specific fluorinated solvent in the present invention is a solvent in which the fluorinated elastic copolymer is soluble.

The specific fluorinated solvent has a perfluorohydrocarbon group. The perfluorohydrocarbon group may be a chain perfluorohydrocarbon group or may be a cyclic perfluorohydrocarbon group.

The chain perfluorohydrocarbon group may be linear or may be branched. The chain perfluorohydrocarbon group may, for example, be a perfluoroalkyl group, a perfluoroalkylene group, a perfluorovinyl alkyl group or a perfluorovinyl alkylene group.

The perfluorohydrocarbon group having the largest number of carbon atoms has from 3 to 7 carbon atoms. When it has at least 3 carbon atoms, solubility of the fluorinated elastic copolymer in the specific fluorinated solvent is excellent. When it has at most 7 carbon atoms, such a fluorinated solvent is easily available.

Further, when it has at most 6 carbon atoms, such a specific fluorinated solvent tends to have a lower boiling point and is easily removed.

The boiling point of the specific fluorinated solvent is from 50 to 160° C. When the boiling point of the specific fluorinated solvent is at least 50° C., such a fluorinated solvent is easily available. When the boiling point of the fluorinated solvent is at most 160° C., such a specific fluorinated solvent is easily removed by evaporation.

When the fluorine atom content of the specific fluorinated solvent as calculate in accordance with the formula 2 is from 69 to 80 mass %. When the fluorine atom content is at least 69 mass %, solubility of the fluorinated elastic copolymer in the specific fluorinated solvent is excellent. When the fluorine atom content is at most 80 mass %, such a specific fluorinated solvent is easily available.

Fluorine atom content (mass %)=(19×number of fluorine atoms in the fluorinated solvent/molecular weight of the fluorinated solvent)×100    2

The specific fluorinated solvent is preferably at least one member selected from the group consisting of a fluorinated compound having a nitrogen atom, a hydrofluorocarbon and a hydrofluoroether. When the specific fluorinated solvent is at least one member selected from the group consisting of a fluorinated compound having a nitrogen atom, a hydrofluorocarbon and a hydrofluoroether, solubility of the fluorinated elastic copolymer in the specific fluorinated solvent tends to be excellent.

As specific examples of the specific fluorinated solvent having a nitrogen atom, compound 10 represented by the following formula 10 may be mentioned. As a commercial product of the compound 10, Fluorinert (registered trademark) FC-770 manufactured by 3M may, for example, be mentioned.

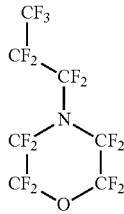

Formula 10

As specific examples of the hydrofluorocarbon, 1,1,1,2,2,3,3,4,4-nonafluorohexane, 1,1,1,2,2,3,3,4,4,5,5,6,6-tridecafluorohexane and 1,1,1,2,2,3,3,4,4,5,5,6,6-tridecafluorooctan may be mentioned.

As a commercial product of 1,1,1,2,2,3,3,4,4,5,5,6,6-tridecafluorohexane, $C_6F_{13}H$ (manufactured by Asahi Glass Company, Limited, ASAHIKLIN (registered trademark) AC-2000) may, for example, be mentioned, and as a commercial product of 1,1,1,2,2,3,3,4,4,5,5,6,6-tridecafluorooctan, $C_6F_{13}C_2H_5$ (manufactured by Asahi Glass Company, Limited, ASAHIKLIN (registered trademark) AC-6000) may, for example, be mentioned.

As specific examples of the hydrofluoroether, $C_2F_5CF(OCH_3)CF(CF_3)_2$ (manufactured by 3M, Novec (registered trademark) 7300) may be mentioned.

The content of the fluorinated elastic copolymer in the fluorinated elastic copolymer composition is not particularly limited. However, the amount of the fluorinated elastic copolymer is preferably from 5 to 40 parts by mass, more preferably from 5 to 30 parts by mass, further preferably from 8 to 25 parts by mass per 100 parts by mass of the specific fluorinated solvent. When the content of the fluorinated elastic copolymer is at most the above upper limit value, the fluorinated elastic copolymer is easily soluble in the specific fluorinated solvent. When the content of the fluorinated elastic copolymer is at least the above lower limit value, the specific fluorinated solvent is easily removed from the fluorinated elastic copolymer composition.

The fluorinated elastic copolymer composition of the present invention may contain a fluorinated solvent other than the specific fluorinated solvent or a non-fluorinated solvent. In a case where a fluorinated solvent other than the specific fluorinated solvent or a non-fluorinated solvent is contained, their content is such that the solubility of the fluorinated elastic copolymer by the specific fluorinated solvent will not remarkably be lowered.

As the fluorinated solvent other than the specific fluorinated solvent and the non-fluorinated solvent, preferred is a solvent having a boiling point of at most 50° C. or a solvent which forms an azeotrope with the specific fluorinated solvent.

In a case where the specific fluorinated solvent, and the fluorinated solvent other than the specific fluorinated solvent or the non-fluorinated solvent are used in combination, the proportion of the volume of the specific fluorinated solvent is preferably at least 90%, more preferably at least 95%, further preferably at least 98%, to the total volume of the specific fluorinated solvent, the fluorinated solvent other than the specific fluorinated solvent, and the non-fluorinated solvent.

In a case where the fluorinated elastic copolymer composition of the present invention contains the fluorinated solvent other than the specific fluorinated solvent or the non-fluorinated solvent, the following wording "removing the specific fluorinated solvent" means that the fluorinated solvent other than the specific fluorinated solvent and the non-fluorinated solvent are also removed.

<Additives>
(Crosslinking Agent)

When the fluorinated elastic copolymer composition further contains a crosslinking agent, e.g. a coating film formed of the fluorinated elastic copolymer composition tends to be excellent in physical properties such as hardness and heat resistance.

The crosslinking agent may, for example, be an organic peroxide, a polyol, an amine or triazine. Among them, in view of excellent productivity, heat resistance and chemical resistance, an organic peroxide is preferred.

The organic peroxide may, for example, be a dialkyl peroxide (such as di-tert-butyl peroxide, tert-butyl cumyl peroxide, dicumyl peroxide, α,α-bis(tert-butylperoxy)-p-diisopropylbenzene, 2,5-dimethyl-2,5-bis(tert-butylperoxy)hexane or 2,5-dimethyl-2,5-bis(tert-butylperoxy)hexyne-3), 1,1-di(tert-butylperoxy)-3,3,5-trimethylcyclohexane, 2,5-dimethylhexane-2,5-dihydroperoxide, benzoyl peroxide, tert-butylperoxybenzene, 1,3-bis(tert-butylperoxyisopropyl)benzene, 2,5-dimethyl-2,5-di(benzoylperoxy)hexane, tert-butylperoxy maleic acid or tert-butylperoxy isopropyl carbonate. The organic peroxide is preferably a dialkyl peroxide.

In a case where the fluorinated elastic copolymer composition contains the crosslinking agent, the content of the crosslinking agent is preferably from 0.3 to 10 parts by mass, more preferably from 0.3 to 5 parts by mass, further preferably from 0.5 to 3 parts by mass per 100 parts by mass of the fluorinated elastic copolymer. When the content of the crosslinking agent is within the above range, the fluorinated elastic copolymer composition tends to be excellent in heat resistance, chemical resistance and the like.

(Crosslinking Aid)

In a case where the fluorinated elastic copolymer composition contains the crosslinking agent, it preferably further contains a crosslinking aid.

In a case where the fluorinated elastic copolymer composition further contains a crosslinking aid, the crosslinking efficiency tends to be higher.

The crosslinking aid may, for example, be triallyl cyanurate, triallyl isocyanurate, trimethallyl isocyanurate, 1,3,5-triacryloyl hexahydro-1,3,5-triazine, triallyl trimellitate, m-phenylenediamine bismaleimide, p-quinone dioxime, p,p'-dibenzoylquinone dioxime, dipropargyl terephthalate, diallyl phthalate, N,N',N'',N'''-tetraallylterephthalamide, a bisolefin-containing compound such as a vinyl group-containing siloxane oligomer (such as polymethylvinylsiloxane or polymethylphenylvinylsiloxane) or a fluorinated aromatic compound having at least two vinyl groups or allyl groups bonded to the aromatic ring. Among them, preferred is at least one crosslinking aid selected from triallyl cyanurate, triallyl isocyanurate, trimethallyl isocyanurate, a bisolefin-containing compound and a fluorinated aromatic compound, and particularly preferred is triallyl isocyanurate.

The fluorinated aromatic compound as the crosslinking aid may, for example, be a compound having at least two groups represented by the following formula 11, which is a compound having at least two groups represented by the following formula 11 bonded to the fluorinated aromatic ring.

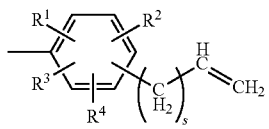

Formula 11 wherein s is 0 or 1, and $R^1$, $R^2$, $R^3$ and $R^4$ are each independently a hydrogen atom or a fluorine atom.

The fluorinated aromatic compound is preferably a fluorinated aromatic compound having at least two hydrogen atoms in the aromatic ring substituted by the group represented by the formula 11. The aromatic ring may, for example, be a benzene ring, a condensed ring containing a benzene ring (such as a naphthalene ring, an anthracene ring, a phenanthrene ring or a pyrene ring), or an aromatic ring containing biphenyl. As the fluorine atom in the fluorinated aromatic compound, at least one of $R^1$ to $R^4$ is a fluorine atom, or a fluorine atom is bonded to the aromatic ring.

The bisolefin-containing compound may be a compound having two groups represented by the following formula 12 bonded to a linear or branched alkylene group which may be substituted by a fluorine atom, a group having at least one etheric oxygen atom in a linear or branched alkylene group which may be substituted by a fluorine atom, a cycloalkylene group which may be substituted by a fluorine atom, or a group having at least one etheric oxygen atom in a cycloalkylene group which may be substituted by a fluorine atom.

  12 wherein $R^{41}$, $R^{42}$ and $R^{43}$ are each independently a hydrogen atom, or a linear or branched alkyl group.

In a case where the fluorinated elastic copolymer composition contains the crosslinking aid, the content of the crosslinking aid is preferably from 0.1 to 10 parts by mass, more preferably from 0.5 to 5 parts by mass per 100 parts by mass of the fluorinated elastic copolymer. When the content of the crosslinking aid is within the above range, a coating film formed of the fluorinated elastic copolymer composition will be more excellent in physical properties such as hardness and heat resistance.

(Other Additives)

In a case where the fluorinated elastic copolymer composition contains additives other than the crosslinking agent and the crosslinking aid, the content of other additives is preferably from 0.01 to 100 parts by mass, more preferably from 0.01 to 10 parts by mass per 100 parts by mass of the fluorinated elastic copolymer. When the content of other additives is within the above range, dispersibility of other additives in the fluorinated elastic copolymer composition will be good.

As other additives, a metal oxide, a pigment, a filler, a reinforcing material or a processing aid may, for example, be mentioned. As other additives, a filler and a reinforcing material are preferred, and accordingly, the fluorinated elastic copolymer composition preferably contains at least one of the filler and reinforcing material.

When the fluorinated elastic copolymer composition further contains a metal oxide, the crosslinking reaction tends to proceed rapidly and securely.

The metal oxide may, for example, be an oxide of a bivalent metal such as magnesium oxide, calcium oxide, zinc oxide or lead oxide.

In a case where the fluorinated elastic copolymer composition contains a metal oxide, the content of the metal oxide is preferably from 0.1 to 10 parts by mass, more preferably from 0.5 to 5 parts by mass per 100 parts by mass of the fluorinated elastic copolymer. When the content of the metal oxide is within the above range, e.g. a coating film formed of the fluorinated elastic copolymer composition will be excellent in hardness.

The filler and the reinforcing material may, for example, be a carbon material, a polymer or a silicon dioxide-containing material.

The carbon material may, for example, be multi-walled carbon nanotubes, single-walled carbon nanotubes, carbon nanofibers, carbon nanobelts, carbon nanohorns, nanographite, fullerene, graphite, carbon fibers or carbon black.

The polymer may, for example, be polytetrafluoroethylene, polyvinylidene fluoride, polyvinyl fluoride, polychlorotrifluoroethylene, a TFE/ethylene copolymer, a TFE/propylene copolymer or a TFE/vinylidene fluoride copolymer.

The silicon dioxide-containing material may, for example, be celite or silica. As the silica, nanosilica may, for example, be mentioned.

As other filler or reinforcing material, cellulose nanofibers, barium sulfate, calcium carbonate, titanium oxide, titanic acid whiskers, metal nanoparticles, clay or talc may, for example, be mentioned.

In a case where the fluorinated elastic copolymer composition further contains at least one of the filler and the reinforcing material, the total content of the filler and the reinforcing material is preferably from 0.01 to 100 parts by mass, more preferably from 0.01 to 10 parts by mass per 100 parts by mass of the fluorinated elastic copolymer. When the total content of the filler and the reinforcing material is within the above range, dispersibility of the filler and the reinforcing material in the fluorinated elastic copolymer composition tends to be good.

The processing aid is not particularly limited. As a processing aid which has a function as a lubricant, a fatty acid metal salt (such as sodium stearate or calcium stearate), synthetic wax (such as polyethylene wax) or a fatty acid ester (such as glycerin monooleate) may, for example, be mentioned.

(Method for Producing Fluorinated Elastic Copolymer Composition)

The fluorinated elastic copolymer composition may be obtained by mixing the fluorinated elastic copolymer, the specific fluorinated solvent and as the case requires, additives such as the crosslinking agent, by an apparatus such as a mixing roll or a sealed mixing machine such as a kneader or a Bunbury mixer.

The mixing time is preferably from 3 to 60 minutes, more preferably from 3 to 20 minutes. When the mixing time is at least 3 minutes, the additives in the fluorinated elastic copolymer composition will be sufficiently dispersed in the specific fluorinated solvent. When the mixing time is at most 60 minutes, the additives will not be broken.

(Mechanism of Action)

In the above-described fluorinated elastic copolymer composition of the present invention, the perfluorohydrocarbon group having the largest number of carbon atoms in the specific fluorinated solvent has at least 3 carbon atoms, and the specific fluorinated solvent has a fluorine atom content of at least 69 mass %, and accordingly solubility of the fluorinated elastic copolymer in the solvent is excellent.

In the fluorinated elastic copolymer composition of the present invention, the perfluorohydrocarbon group having the largest number of carbon atoms in the specific fluorinated solvent has at most 7 carbon atoms, the specific fluorinated solvent has a boiling point of at least 50° C., and the specific fluorinated solvent has a fluorine atom content of at most 80 mass %, and accordingly the solvent is easily available.

In the fluorinated elastic copolymer composition of the present invention, since the specific fluorinated solvent has a boiling point of at most 160° C., the solvent is easily removed.

(Application)

As the application of the fluorinated elastic copolymer composition of the present invention, a coating material, an adhesive, and a coated article having a coating film formed of the coating material may be mentioned.

Further, in a composition having the specific fluorinated solvent removed from the fluorinated elastic copolymer composition of the present invention containing additives such as the crosslinking agent, dispersibility of constituents is good.

<Coating Material/Adhesive>

The coating material and the adhesive of the present invention contain the above-described fluorinated elastic copolymer composition of the present invention. The fluorinated elastic copolymer composition of the present invention may be used as the coating material or the adhesive of the present invention as it is.

The coating material and the adhesive of the present invention may contain, in addition to the above additives, additives such as a silane coupling agent.

The method of attaching the coating material or the adhesive of the present invention to a substrate is not particularly limited. A method of attaching the coating material or the adhesive to the surface of a substrate by a coating method such as application, impregnation, dipping, spraying, brushing, padding, size press coating or roller coating and removing the specific fluorinated solvent to form a coating film may, for example, be mentioned.

(Mechanism of Action)

Since the above-described coating material and adhesive of the present invention contain the fluorinated elastic copolymer composition of the present invention, solubility of the fluorinated elastic copolymer in the solvent is excellent, the solvent is easily removed by evaporation, and the solvent is easily available.

<Coated Article>

The coated article of the present invention has a coating film containing no specific fluorinated solvent, formed of the above-described coating material of the present invention, on the surface of a substrate.

The substrate is not particularly limited. Fibers, fiber fabric, fiber-knitted fabric, nonwoven fabric, glass, paper, wood, leather, synthetic leather, stone, concrete, ceramics, plastic such as a rubber or a resin, a porous resin or porous fibers may, for example, be mentioned. As the material of the porous resin, polypropylene or polytetrafluoroethylene (PTFE) may, for example, be mentioned.

The coated article of the present invention is obtained by treating the substrate with the coating material of the present invention. For example, the coated article of the present invention may be produced by attaching the above-described coating material of the present invention to a substrate and removing the specific fluorinated solvent.

The method of attaching the coating material or the adhesive of the present invention to a substrate is not particularly limited. A method may be mentioned of attaching the coating material or the adhesive to the surface of a substrate by a coating method such as application, impregnation, dipping, spraying, brushing, padding, size press coating or roller coating, and removing the specific fluorinated solvent. Removal of the specific fluorinated solvent may be carried out at room temperature or may be carried out by heating, and is preferably carried out by heating. In a case where removal is carried out by heating, heating to about 80° C. to about 120° C. is preferred.

Further, in a case where the fluorinated elastic copolymer composition contains a crosslinking agent, after removal of the specific fluorinated solvent, as the case requires, the composition is preferably heated to at least 120° C. for crosslinking. In a case where crosslinking is carried out, crosslinking may be carried out in the presence of an inert gas such as a nitrogen gas. The crosslinking temperature is preferably from 100 to 200° C., more preferably from 100 to 150° C.

(Application}

As the application of the coated article of the present invention, transport (such as an automobile, a train, shipping or an aircraft), a civil engineering member (such as a bridge member or a lattice tower), an industrial member (such as a waterproof sheet, a tank or a pipe), a communication member, an electric member, an electronic member, a surface sheet for a solar cell module, a back sheet for a solar cell module, etc. may be mentioned.

(Mechanism of Action)

Since the above-described coated article of the present invention has a coating film formed of the coating material of the present invention, the solvent is easily removed at the time of production. Accordingly, the coated article of the present invention can be obtained without lowering workability.

<Method for Producing Composition Containing no Specific Fluorinated Solvent>

In the fluorinated elastic copolymer composition of the present invention containing additives such as the crosslinking agent, additives which can hardly be dispersed even by applying a shearing force can be dispersed. Accordingly, by removing the specific fluorinated solvent from the fluorinated elastic copolymer composition of the present invention containing additives, a composition containing no specific fluorinated solvent, having excellent dispersibility of constituents, can be obtained.

Removal of the specific fluorinated solvent may be carried out at room temperature or may be carried out by heating, and is preferably carried out by heating. In a case where removal is carried out by heating, heating to about 80 to about 120° C. is preferred.

Further, the composition containing no specific fluorinated solvent, obtained from the fluorinated elastic copolymer composition containing the crosslinking agent, is preferably heated to at least 120° C. for crosslinking, as the case requires. In a case where crosslinking is carried out, crosslinking may be carried out in the presence of an inert gas such as a nitrogen gas. The crosslinking temperature is preferably from 100 to 200° C., more preferably from 100 to 150° C.

(Application)

As the application of a crosslinked product obtained by crosslinking the composition containing no specific fluorinated solvent, obtained from the fluorinated elastic copolymer composition containing the crosslinking agent, a valve, a hose, a sheet, a sponge, a rubber roll, a sealing material, a coating material, an oil drilling member, etc. may be mentioned.

Specifically, a calendered sheet, a mohno pump, a radiating sheet, an insulating sheet for an automobile, a rubber sponge bearing seal, an O-ring, a V-ring, a food container packing, a water bottle packing, a water heater packing, a packing for an endoscope, a gasket, an oil seal, a diaphragm, an electric wire coating material, rubber gloves, a button switch, an electrically conductive member, an electrically conductive member, an electrically conductive seal, an electrically conductive hose, etc. may be mentioned.

(Mechanism of Action)

In the composition containing no specific fluorinated solvent, obtained by removing the specific fluorinated solvent from the fluorinated elastic copolymer composition of the present invention containing additives such as the crosslinking agent, dispersibility of constituents is good even after the specific fluorinated solvent is removed, since dispersibility of constituents constituting the composition is good in the specific fluorinated elastic copolymer composition. Further, the additives and the like are not broken since no strong force such as shearing force is applied.

Examples

Now, the present invention will be described in detail with reference to Examples, but the present invention is by no means restricted to the following description. Ex. 3 to 5, 7, 8 and 20 to 23 are Examples of the present invention, and Ex. 1, 2, 6, 9 to 19 and 24 are Comparative Examples.

<Measurement, Evaluation>

(Number of Carbon Atoms: $C_{fn}$ of Perfluorohydrocarbon Group Having the Largest Number of Carbon Atoms, and Fluorine Atom Content)

With respect to fluorinated solvents 2, 7, 15, 18 and 19, the structural formula of the fluorinated solvent was determined from the results of $^{19}$F-NMR analysis, fluorine atom content analysis and infrared spectral analysis.

The number of carbon atoms ($C_{fn}$) of the perfluorohydrocarbon group having the largest number of carbon atoms in the structural formula was counted. In a case where the perfluorohydrocarbon group has a branched chain, the number was counted including the number of carbon atoms in the branched chain.

Further, the fluorine atom content of the fluorinated solvent was calculated in accordance with the following formula 2.

Fluorine atom content (mass %)=(19×number of fluorine atoms in the fluorinated solvent/molecular weight of the fluorinated solvent)×100    2

(Solubility)

The fluorinated elastic copolymer and the fluorinated solvent were mixed at 1,500 rpm for 15 minutes. The mixture was left at rest at 23° C. for 24 hours, and a case where the fluorinated elastic copolymer was soluble in the fluorinated solvent was evaluated as O, and a case where the fluorinated elastic copolymer was insoluble in the fluorinated solvent was evaluated as x.

(Film Hardness)

Pencil scratch hardness test (JIS K5600-5-4:1999) was carried out on a surface of a coating film formed of the prepared coating material.

Compounds used in Ex. are as follows.

(Fluorinated Elastic Copolymer)

FFKM: TFE/PAVE copolymer, having a proportion of the TFE units of 69 mol % and a proportion of the PAVE units of 31 mol % to the total amount of all units constituting FFKM, and containing 0.15 mass % of iodine atoms to the total mass of FFKM.

(Fluorinated Solvent)

Fluorinated solvent 1: $C_{14}F_{24}$ (perfluoroperhydrophenanthrene, manufactured by F2 Chemicals Ltd., trade name: Flutec (registered trademark) PP-11).

Fluorinated solvent 2: $CF_3(CF_2)_7CH_2CH_3$.

Fluorinated solvent 3: $CF_3(CF_2)_5CH_2CH_3$ (manufactured by AGC Inc., trade name: ASAHIKLIN (registered trademark) AC-6000).

Fluorinated solvent 4: $CF_3(CF_2)_4CF_2H$ (manufactured by AGC Inc., trade name: ASAHIKLIN (registered trademark) AC-2000).

Fluorinated solvent 5: $CF_3CF_2CF(OCH_3)CF(CF_3)_2$ (manufactured by 3M, trade name: Novec (registered trademark) 7300).

Fluorinated solvent 6: $(CF_3(CF_2)_3)_3N$ (manufactured by 3M, trade name: Fluorinert (registered trademark) FC-43).

Fluorinated solvent 7: $CF_3(CF_2)_3CH_2CH_3$.

fluorinated solvent 8: $C_7OF_{15}N$, compound 10 (manufactured by 3M, trade name: Fluorinert (registered trademark) FC-770).

Fluorinated solvent 9: $CF_3(CF_2)_3OCH_3$ (manufactured by 3M, trade name: Novec (registered trademark) 7100).

Fluorinated solvent 10: $CF_3(CF_2)_3OCH_2CH_3$ (manufactured by 3M, trade name: Novec (registered trademark) 7200).

Fluorinated solvent 11: $C_5H_3F_7$ (1,1,2,2,3,3,4-heptafluorocyclopentane, manufactured by Zeon Corporation, trade name: ZEORORA (registered trademark) H).

Fluorinated solvent 12: $CF_3(CHF)_2CF_2CF_3$ (manufactured by Chemours, trade name: Vertrel (registered trademark) XF)).

Fluorinated solvent 13: $CF_3CH_2OCF_2CHF_2$ (manufactured by AGC Inc., trade name: ASAHIKLIN (registered trademark) AE-3000).

Fluorinated solvent 14: $CClF_2CF_2CHFCl$ (manufactured by AGC Inc., trade name: ASAHIKLIN (registered trademark) AK-225).

Fluorinated solvent 15: $C_6H_4(CF_3)_2$ (1,2-bis(trifluoromethyl)cyclohexane).

Fluorinated solvent 16: $CHF_2CF_2CH_2OH$.

Fluorinated solvent 17: $(CF_3)_2CHOH$ (manufactured by Central Glass Co., Ltd., 1,1,1,3,3,3-hexafluoro-2-isopropanol (HFIP)).

Fluorinated solvent 18: $CF_3(CF_2)_5COOCH_3$.

Fluorinated solvent 19: $CF_3(CF_2)_7COOCH_3$.

The fluorinated solvents 2, 7, 15, 18 and 19 were prepared by a known method.

(Crosslinking Agent)

2,5-dimethyl-2,5-bis(tert-butylperoxy)hexane (manufactured by NOF CORPORATION, trade name: PERHEXA 25B).

(Crosslinking Aid)

Triallyl isocyanurate 60% diluted with silica (manufactured by Nihon Kasei CO., LTD., trade name: TAIC WH-60).

(Filler)

Carbon black (manufactured by Cancarb Limited, trade name: Thermax (registered trademark) N990).

Silica (manufactured by NIPPON AEROSIL CO., LTD., trade name: AEROSIL R8200).

(Processing Aid)

Sodium stearate (manufactured by NOF CORPORATION, trade name: NONSOUL (registered trademark) SN-1)).

(Ex. 1 to 19)

8 g of FFKM and 40 ml of the fluorinated solvent in each Ex. as shown in Table 1 were mixed by a stirring machine (Awatori Rentaro, manufactured by THINKY CORPORATION) at 1,500 rpm for 15 minutes. Solubility was evaluated with respect to the fluorinated solvents 1 to 19.

The fluorinated solvents 1, 6 and 11 are a perfluorocarbon. The fluorinated solvents 2, 3, 4, 7, 12 and 15 are a hydrofluorocarbon. The fluorinated solvents 5, 9, 10 and 13 are a hydrofluoroether. The fluorinated solvents 6 and 8 are a fluorinated solvent having a nitrogen atom. The fluorinated solvent 14 is a hydrochlorofluorocarbon. The fluorinated solvents 16 and 17 are an alcohol. The fluorinated solvents 18 and 19 are an ester.

In Ex. 3 to 5, 7 and 8, FFKM was soluble in the fluorinated solvents 3 to 5, 7 and 8, and the solvents had a boiling point of from 50 to 160° C., and accordingly the solvents were easily removed.

However, in Ex. 1 and 2, the fluorinated solvents 1 and 2 had $C_{fn}$ of larger than 7 and a boiling point of higher than 160° C., and accordingly such solvents were hardly available and were hardly removed.

In Ex. 6, the fluorinated solvent 6 had a boiling point of higher than 160° C. and was thereby hardly removed.

In Ex. 9 to 11 and 18, the fluorinated solvents 9 to 11 and 18 had a fluorine atom content of less than 69 mass %, and accordingly FFKM could not be soluble in the solvents.

In Ex. 12 and 13, the fluorinated solvents 12 and 13 had $C_{fn}$ of less than 3, and accordingly FFKM could not be soluble in the solvents.

In Ex. 14 to 17, the fluorinated solvents 14 to 17 had Cfn of less than 3 and a fluorine atom content of less than 69 mass %, and accordingly FFKM could not be soluble in the solvents.

In Ex. 19, the fluorinated solvent 19 had $C_{fn}$ of larger than 7 and a fluorine atom content of less than 69 mass %, and accordingly FFKM could not be soluble in the solvent. Further, the fluorinated solvent 19 had a boiling point of higher than 160° C. and was thereby hardly removed.

(Ex. 20 to 24)

First, in accordance with Table 2, compound A containing FFKM and compound B containing FFKM were prepared.

TABLE 1

| Ex. | Fluorinated solvent | $C_{fn}$ | Fluorine atom content [mass %] | Boiling point [° C.] | Chemical formula | Molecular weight | Solubility |
|---|---|---|---|---|---|---|---|
| 1 | Fluorinated solvent 1 | 14 | 73 | 215 | $C_{14}F_{24}$ | 624 | ○ |
| 2 | Fluorinated solvent 2 | 8 | 72 | 162 | $CF_3(CF_2)_7CH_2CH_3$ | 448 | ○ |
| 3 | Fluorinated solvent 3 | 6 | 71 | 115 | $CF_3(CF_2)_5CH_2CH_3$ | 348 | ○ |
| 4 | Fluorinated solvent 4 | 6 | 77 | 71 | $CF_3(CF_2)_4CF_2H$ | 320 | ○ |
| 5 | Fluorinated solvent 5 | 6 | 71 | 98 | $CF_3CF_2CF(OCH_3)CF(CF_3)_2$ | 350 | ○ |
| 6 | Fluorinated solvent 6 | 4 | 76 | 174 | $(CF_3(CF_2)_3)_3N$ | 672 | ○ |
| 7 | Fluorinated solvent 7 | 4 | 69 | 63 | $CF_3(CF_2)_3CH_2CH_3$ | 248 | ○ |
| 8 | fluorinated solvent 8 | 3 | 71 | 95 | $C_7OF_{15}N$ | 400 | ○ |
| 9 | Fluorinated solvent 9 | 4 | 68 | 61 | $CF_3(CF_2)_3OCH_3$ | 250 | x |
| 10 | Fluorinated solvent 10 | 4 | 65 | 76 | $CF_3(CF_2)_3OCH_2CH_3$ | 264 | x |
| 11 | Fluorinated solvent 11 | 3 | 68 | 83 | $C_5H_3F_7$ | 196 | x |
| 12 | Fluorinated solvent 12 | 2 | 75 | 55 | $CF_3(CHF)_2CF_2CF_3$ | 240 | x |
| 13 | Fluorinated solvent 13 | 1 | 67 | 56 | $CF_3CH_2OCF_2CHF_2$ | 200 | x |
| 14 | Fluorinated solvent 14 | 1 | 47 | 54 | $CClF_2CF_2CHFCl$ | 202 | x |
| 15 | Fluorinated solvent 15 | 1 | 53 | 116 | $C_6H_4(CF_3)_2$ | 214 | x |
| 16 | Fluorinated solvent 16 | 1 | 58 | 106 | $CHF_2CF_2CH_2OH$ | 132 | x |
| 17 | Fluorinated solvent 17 | 1 | 68 | 58 | $(CF_3)_2CHOH$ | 168 | x |
| 18 | Fluorinated solvent 18 | 6 | 65 | 141 | $CF_3(CF_2)_5COOCH_3$ | 378 | x |
| 19 | Fluorinated solvent 19 | 8 | 68 | 178 | $CF_3(CF_2)_7COOCH_3$ | 478 | x |

TABLE 2

|  | Compound A | Compound B |
|---|---|---|
| FFKM (g) | 100 | 100 |
| Crosslinking agent (g) | 1 | 1 |
| Crosslinking aid (g) | 5 | 5 |
| Carbon black (g) | 10 | — |
| Silica (g) | — | 5 |
| Processing aid (g) | 1 | — |

Then, in accordance with Table 3, components were stirred by Awatori Rentaro (manufactured by THINKY CORPORATION) at 1,500 rpm for 15 minutes to obtain a fluorinated elastic copolymer composition containing FFKM and the fluorinated solvent. In Ex. 20 to 23, FFKM, the crosslinking agent, the crosslinking aid and other additives were well dispersed in the fluorinated solvent 4. In Ex. 24, since the fluorinated solvent 14 was used, compound A was insoluble. The fluorinated elastic copolymer compositions in Ex. 20 to 23 were used as a coating material as they were.

The coating material obtained in each of Ex. 20 to 23 was applied to the surface of an aluminum plate and heated at 100° C. to remove the fluorinated solvent 4. The coating material was further heated in a nitrogen atmosphere at 150° C. for 30 minutes and then heated in an air atmosphere at 200° C. for 4 hours to crosslink the fluorinated elastic copolymer thereby to obtain a coating film. Of the obtained coating film, the film hardness was evaluated in accordance with the above-described evaluation method. Further, the color tone of the coating film was visually evaluated. The evaluation results are shown in Table 3.

TABLE 3

| Ex. | 20 | 21 | 22 | 23 | 24 |
|---|---|---|---|---|---|
| Compound A | 8 g | 8 g | — | — | 8 g |
| Compound B | — | — | 8 g | 8 g | — |
| Fluorinated solvent 4 | 40 ml (67 g) | 40 ml (67 g) | 40 ml (67 g) | 40 ml (67 g) | — |
| Fluorinated solvent 14 | — | — | — | — | 40 ml (62 g) |
| Silane coupling agent | — | 0.2 g | — | 0.2 g | — |
| Film hardness | 2B | B | F | H | — |
| Color tone of coating film | Black | Black | Translucent | Translucent | — |

The coating material containing FFKM and the fluorinated solvent 4 is capable of forming a coating film with film hardness of 2B or harder. Further, the coating material containing FFKM and the fluorinated solvent 4 is capable of adjusting the color tone of the obtainable coating film to be black to translucent when it contains a pigment such as carbon black or silica.

INDUSTRIAL APPLICABILITY

The fluorinated elastic copolymer composition of the present invention and a crosslinked product of the fluorinated elastic copolymer composition of the present invention are suitable for materials of a hose, an O ring, a sheet, a gasket, an oil seal, a diaphragm and a V ring. Further, they are applicable to e.g. a heat resistant chemical resistant sealing material, a heat resistant oil resistant sealing material, an electric wire coating material, a sealing material for a semiconductor device, a corrosion resistant rubber coating material, a sealing material for a urea resistant grease, a rubber coating material, a calendared sheet, a sponge, a rubber roll, an oil drilling member, a radiating sheet, a solution crosslinked product, a rubber sponge bearing seal (such as a urea resistant grease), a lining (chemical resistant), an insulating sheet for an automobile, a packing for an endoscope (amine resistant), a mohno pump, a bellows hose (a processed product of a calendared sheet), a water heater packing or valve, a fender (ocean civil engineering, shipping), fibers and nonwoven fabric (such as protective clothing), a base sealing material, rubber gloves, a button switch, a food container packing, a water bottle packing, an electrically conductive member, an electrically conductive seal and an electrically conductive hose.

This application is a continuation of PCT Application No. PCT/JP2018/037457, filed on Oct. 5, 2018, which is based upon and claims the benefit of priority from Japanese Patent Application No. 2017-198408 filed on Oct. 12, 2017. The contents of those applications are incorporated herein by reference in their entireties.

What is claimed is:

1. A fluorinated elastic copolymer composition comprising a fluorinated elastic copolymer having units based on tetrafluoroethylene and units based on a compound represented by the following formula 1, a fluorinated solvent, and a crosslinking agent, or a crosslinking agent and a crosslinking aid, wherein the fluorinated solvent has at least one perfluorohydrocarbon group, and fluorinated solvent has at least one member selected from the group consisting of a fluorinated compound having a nitrogen atom, a hydrofluorocarbon and a hydrofluoroether, the perfluorohydrocarbon group having the largest number of carbon atoms has from 3 to 7 carbon atoms, the fluorinated solvent has a boiling point of from 50 to 160° C., the fluorinated solvent has a fluorine atom content as calculated in accordance with the following formula 2 of from 69 to 80 mass %, and wherein the amount of the fluorinated elastic copolymer is from 8 to 25 parts by mass per 100 parts by mass of the fluorinated solvent, the content of the crosslinking agent is from 0.3 to 10 parts by mass per 100 parts by mass of the fluorinated elastic copolymer, and in a case where the crosslinking aid is contained, the content of the crosslinking aid is from 0.1 to 10 parts by mass per 100 parts by mass of the fluorinated elastic copolymer:

$$CF_2=CFOR^{f1} \qquad 1$$

wherein $R^{f1}$ is a $C_{1-10}$ perfluoroalkyl group;

fluorine atom content (mass %)=(19× number of fluorine atoms in the fluorinated solvent/molecular weight of the fluorinated solvent)×100 formula 2.

2. The fluorinated elastic copolymer composition according to claim 1, which further comprises at least one filler.

3. The fluorinated elastic copolymer composition according to claim 2, wherein the at least one filler is present in an amount of from 0.01 to 100 parts by mass per 100 parts by mass of the fluorinated copolymer.

4. A coating material comprising the fluorinated elastic copolymer composition as defined in claim 1.

5. An adhesive comprising the fluorinated elastic copolymer composition as defined in claim 1.

6. A coated article having a coating film containing no fluorinated solvent, formed of the coating material as defined in claim 4.

7. The coated article according to claim 6, wherein the coating material is a coating material containing a crosslinking agent or a crosslinking agent and a crosslinking aid, and the coating film is a coating film formed of a crosslinked fluorinated elastic copolymer.

8. A method for producing a composition containing no fluorinated solvent, which comprises mixing a crosslinking agent or a crosslinking agent and a crosslinking aid, a fluorinated elastic copolymer having units based on tetrafluoroethylene and units based on a compound represented by the following formula 1, and the following fluorinated solvent, to produce a fluorinated elastic copolymer composition, and removing the fluorinated solvent, wherein the fluorinated solvent has at least one perfluorohydrocarbon group, and at least one member selected from the group consisting of a fluorinated compound having a nitrogen atom, a hydrofluorocarbon and a hydrofluoroether, the perfluorohydrocarbon group having the largest number of carbon atoms has from 3 to 7 carbon atoms, the fluorinated solvent has a boiling point of from 50 to 160° C., and the fluorinated solvent has a fluorine atom content as calculated in accordance with the following formula 2 of from 69 to 80 mass %:

$$CF_2=CFOR^{f1} \quad \quad 1$$

wherein $R^{f1}$ is a $C_{1-10}$ perfluoroalkyl group;

fluorine atom content (mass %)=(19×number of fluorine atoms in the fluorinated solvent/molecular weight of the fluorinated solvent)×100 formula 2, wherein the amount of the fluorinated elastic copolymer is from 8 to 25 parts by mass per 100 parts by mass of the fluorinated solvent, the content of the crosslinking agent is from 0.3 to 10 parts by mass per 100 parts by mass of the fluorinated elastic copolymer, and in a case where the crosslinking aid is contained, the content of the crosslinking aid is from 0.1 to 10 parts by mass per 100 parts by mass of the fluorinated elastic copolymer.

9. The method for producing a composition containing no fluorinated solvent according to claim 8, wherein the fluorinated elastic copolymer composition further contains at least one filler.

* * * * *